United States Patent [19]

Sandford, II et al.

[11] Patent Number: 5,778,102
[45] Date of Patent: Jul. 7, 1998

[54] COMPRESSION EMBEDDING

[75] Inventors: Maxwell T. Sandford, II; Theodore G. Handel; Jonathan N. Bradley, all of Los Alamos, N. Mex.

[73] Assignee: The Regents of the University of California, Office of Technology Transfer, Alameda, Calif.

[21] Appl. No.: 772,188

[22] Filed: Dec. 19, 1996

Related U.S. Application Data

[63] Continuation-in-part of Ser. No. 442,592, May 17, 1995, abandoned.

[51] Int. Cl.$^6$ .................................................. G06K 9/00
[52] U.S. Cl. ........................................ 382/251; 382/239
[58] Field of Search ........................ 364/715.02; 382/233, 382/236, 250, 232, 254, 234, 235, 238, 239, 240, 244, 248, 251, 252, 253, 168, 170, 166, 274, 245, 246, 247, 306; 348/416; 358/426, 434, 470, 456, 261.1, 261.2, 261.3, 261.4, 427, 262.1; 235/382, 494; 380/7, 10, 54; 395/162, 118, 101

[56] References Cited

U.S. PATENT DOCUMENTS

| | | | |
|---|---|---|---|
| 4,661,849 | 4/1987 | Hinman | 358/136 |
| 5,379,356 | 1/1995 | Purcell et al. | 382/56 |
| 5,608,656 | 3/1997 | Purcell et al. | 364/514 R |
| 5,636,292 | 6/1997 | Rhoads | 382/232 |

Primary Examiner—Leo H. Boudreau
Assistant Examiner—Bijan Tadayon
Attorney, Agent, or Firm—Milton D. Wyrick

[57] ABSTRACT

A method and apparatus for embedding auxiliary information into the digital representation of host data created by a lossy compression technique and a method and apparatus for constructing auxiliary data from the correspondence between values in a digital key-pair table with integer index values existing in a representation of host data created by a lossy compression technique. The methods apply to data compressed with algorithms based on series expansion, quantization to a finite number of symbols, and entropy coding. Lossy compression methods represent the original data as ordered sequences of blocks containing integer indices having redundancy and uncertainty of value by one unit, allowing indices which are adjacent in value to be manipulated to encode auxiliary data. Also included is a method to improve the efficiency of lossy compression algorithms by embedding white noise into the integer indices. Lossy compression methods use loss-less compression to reduce to the final size the intermediate representation as indices. The efficiency of the loss-less compression, known also as entropy coding compression, is increased by manipulating the indices at the intermediate stage. Manipulation of the intermediate representation improves lossy compression performance by 1 to 10%.

29 Claims, 21 Drawing Sheets

```
/*******************************************************************************
 * JHISTGM.C  Code module to process the histogram data to select key
 *                  pairs for use in
 *                  the compression embedding method.
 *
 * ORIGIN:  Derived from the Compression Embedding application code.
 *
 * Copyright (c) 1994-1996.  M. T. Sandford II and the University of California.
 *     All Rights Reserved.
 *
 * Version 1.10   10-15-96
 *******************************************************************************/ include <stdlib.h>
include <stdio.h>
include <string.h> define H_TABLE_SIZE 2048         /* range of the quantizer output (+/- 1023) */
define MAXPAIRS 256      /* maximum number of pairs permitted for the key */
#define MINVAL -1024      /* minimum value from quantizer output */
#define HISTLIMIT 3                      /* low-frEquation limit for histogram entries
(+/- limit) */ struct PAIRS {
    short i;
    short j;
    unsigned long count;
};

/* function prototypes */
void p_sort(struct PAIRS *pair, int no_pair);
void jumble(int *index, int npts);
int duplicate (int nopairs, struct PAIRS *pair);
void jhistgm(long *hist_table, struct PAIRS *pair,int *no_pairs);
void scramble(int no_pairs, struct PAIRS *pair);
extern unsigned long GetAuxFileSize(void);
extern unsigned short getrepwidth(unsigned long size);
```

FIG. 6(a)

```
/***********************************************************************
* JHISTGM:  routine to process the histogram table and to determine a noise key
*
*   INPUT:                        hist_table, pointer to unsigned long histogram data
*
*   OUTPUT:  *pair[],   values of the pairs stored in a structure array
*
*   RETURN:  nothing
***********************************************************************/
void jhistgm(long *hist_table, struct PAIRS *pair,int *no_pairs) {
int j;
int iloop;
long lsum;
long lavg;
long ldiff;
unsigned long file_size=0L;
/*  Process histogram to select embedding pairs */
 j = 0;
 for(iloop=0;iloop<H_TABLE_SIZE;iloop++)     {
    if(hist_table[iloop]==0 || abs(iloop+MINVAL) < HISTLIMIT) { //skip zero entries & avoid low frEquation
                                        iloop += 1;
                                        continue;
                                        }
    lsum = hist_table[iloop]+hist_table[iloop+1];
    lavg = lsum/2L;
    ldiff = hist_table[iloop]-hist_table[iloop+1];
    ldiff = labs(ldiff);
    if(ldiff < lavg) {  /* Difference less than avg. for the pair */
                                        pair[j].i = iloop+(int)MINVAL;
                                        pair[j].j = iloop+(int)MINVAL+1;
                                        pair[j].count = (unsigned long)lsum;
                                        j++;
                                        iloop+=2;
                                        if(j==MAXPAIRS)break;
                                        }
    }
```

FIG. 6(b)

```
lsum = 0L;
*no_pairs = duplicate(j,pair);  /* remove duplicates (there should not be any) */
for (iloop=0;iloop<*no_pairs;iloop++) {
   if(pair[iloop].i==pair[iloop].j)break;
   lsum += pair[iloop].count;

#ifdef PROGRESS_REPORT
   fprintf(stderr,"\npair[%3d] %4d %4d %5ld", iloop,\
                                 pair[iloop].i, pair[iloop].j, pair[iloop].coun:)
#endif
   }

// check the embedding space against the amount of auxiliary data
file_size = GetAuxFileSize();
fprintf(stderr,"\n%d pairs located. Total embedding space = %ld bytes", *no_pairs, lsum/8L);
if(file_size*8L > (unsigned long)lsum) {
    fprintf(stderr,"\nAuxiliary file size = %ld bytes", file_size);
    *no_pairs = 0;
    }

// reduce key to the minimum size needed to embed the file
for(iloop=0;iloop<*no_pairs;iloop++) {
    if(lsum-pair[iloop].count >= file_size*8L + getrepwidth(file_size) + 5) {
                                  lsum -= pair[iloop].count;
                                  pair[iloop].count = 0L;    // throw out this pair
                                  }
    }
*no_pairs = duplicate(*no_pairs,pair);   // remove discarded pairs
scramble(*no_pairs,pair);                // mix up the pairs to form a random key
lsum = 0L;
for(iloop=0;iloop<*no_pairs;iloop++)
    lsum += pair[iloop].count;
if((unsigned long)lsum >= file_size*8L + getrepwidth(file_size) +5)
    fprintf(stderr,"\n%d byte key",*no_pairs*2);
    return;
}
```

FIG. 6(c)

```
/*      DUPLICATE:   Routine to remove entries containing duplicate
                     histogram values in the PAIRS structure
*       INPUT:       no_pairs, integer no. of pairs in the pixel pair
                     table
*                    pixpairs, table of PAIRS structures
*       RETURN:      new value for no_pairs (0 if no entries exist)
*       AUTHOR:      Copyright (c) 1994-95, M. T. Sandford II
*                                 Univ. of California, Los Alamos National
                     Laboratory
***************************************************************************/
include <stdlib.h> struct PAIRS {          /* structure of pallet pair data entries */
    int i;
    int j;
    unsigned long count;
};
int duplicate (int nopairs, struct PAIRS *pair) {
int i;          /* counters */
int j;
int k=0;
if(nopairs == 0)return k;                   /* return if nothing to do */
p_sort(pair,k);                             /* sort pairs by frequency of occurrence */
for(i=0;i<nopairs;i++)                      {
    if(pair[i].count==0L)continue;
    for(j=0;j<nopairs;j++)                  {
        if(j==i)continue;
        if(pair[j].count==0)continue;
        if(pair[j].i == pair[i].i ||
           pair[j].i == pair[i].j ||
           pair[j].j == pair[i].i ||
           pair[j].j == pair[i].j) {
            if(pair[j].count < pair[i].count)
                pair[j].count = 0;
            else {
                                            pair[i].count = 0;
                                            break;
                                            }
        }
    }
}
```

FIG. 7(a)

```
for(i=0;i<nopairs;i++) { /* remove null entries from pair table */
    j = i+1;
    while(pair[i].count == 0) {
                                    for(k=j;k<nopairs;k++)
                                        pair[k-1] = pair[k];
                                    nopairs--;
                                    if(nopairs==0) break;
    }
    if(nopairs==0)break;
}
return i;
}
```

FIG. 7(b)

```
/****************************************************************************
*
* SCRAMBLE.C: Routine to scramble the pair order to a random sequence
*
* INPUT:    no_pairs, integer no. of pairs to scramble
*           pair, pointer to table of structures to scramble
*
* RETURNS:  nothing
*
* OUTPUT:   pair, pointer to the scrambled table of pair structures
*
* AUTHOR:   M. T. Sandford II, 6 Oct. 1994 * Version 1.0
* Copyright © 1996 The University of California and M. T. Sandford II
* All Rights Reserved.
****************************************************************************/
void scramble(int no_pairs, struct PAIRS *pair) {
  int i;                          /* loop counter */
  int *index=NULL;                /* scrambled index values */
  struct PAIRS *temp_pair=NULL;   /* temporary pair structure table */ index = (int *)malloc(no_pairs*sizeof(int));
  temp_pair = (struct PAIRS *)malloc(no_pairs*sizeof(struct PAIRS));
  if(index==NULL || temp_pair==NULL) {
    if(index)free(index);
    if(temp_pair)free(temp_pair);
    fprintf(stderr,"\nJumble memory allocation failed!");
    return;  /* no scrambling performed */
  }
  jumble(index,no_pairs);
  for(i=0;i<no_pairs;i++) {
    temp_pair[i].i = pair[index[i]].i;
    temp_pair[i].j = pair[index[i]].j;
    temp_pair[i].count = pair[index[i]].count;
  }
  memmove(pair,temp_pair,no_pairs*sizeof(struct PAIRS));
  free(index);
  free(temp_pair);
```

FIG. 8(a)

```
    // now scramble the parity of the entries in the pair tables
    for(i=0;i<no_pairs;i++) {
      int temp;
      temp = rand();
      if(temp > RAND_MAX/2) {
                                        temp = pair[i].j;
                                        pair[i].j = pair[i].i;
                                        pair[i].i = temp;
                                        }
                                }
    return;
}
/***********************************************************************
 * JUMBLE.C:  Routine to jumble a table of indices using pseudo-random
 *            numbers seeded from the PC clock
 *
 * INPUT:     index, pointer to a table of jumbled integers
 *            npts, integer no. of entries in the index table
 *
 * RETURN:    nothing
 *
 * OUTPUT:    returns a jumbled table of integers
 *
 * AUTHOR:    M. T. Sandford II, 5 Oct. 1994, following the method
 *            preferred by T. Handel
 ***********************************************************************/
void jumble(int *index, int npts) {
int i;
float fi;
struct POINTS {
   float gamma;
   int i;
   } *pts;
pts = malloc(sizeof(struct POINTS)*npts);
for (i=0;i<npts;i++) {
   pts[i].i = i;
   pts[i].gamma = (float)rand()/(float)RAND_MAX;
   }
qsort( (void *)pts, (size_t)npts, sizeof(struct POINTS),
                                        index_compare);
```

FIG. 8(b)

```
for(i=0;i<npts;i++) {
    index[i] = pts[i].i;
/*    printf("\ni,index[i] %d %d", i, index[i]); */
    }
if(index[0]==0) {
   fi = (float)rand()/(float)RAND_MAX;
   fi *= (float)(npts-1)+1.0f;
   index[0] = index[(int)fi];
   index[(int)fi] = 0;
   }
free(pts);
}
```

FIG. 8(c)

```
/*******************************************************************************
* JEMBED.C Code module to perform embedding into the quantizer indices
*
* Author: M. T. Sandford II, Sept. 4, 1996. Version 1.10
*
* Copyright (c) 1994-1996. M. T. Sandford II and the University of California
*   All Rights Reserved.
*
*******************************************************************************/
#include <stdio.h>
#include <stdlib.h>
include <memory.h> define MAXPAIRS 256            /* maximum no. of pairs */
define MAXSIZE  2049           /* maximum no. of indices */
#define MINVAL   -1024      /* minimum index value */

/*******************************************************************************
*   Embed_Data_Block:  Routine to embed data into a block of integers using
*                      the pairs in the structure pair. This code was re-
*                      written from the original version, to use table look-up
*                      for the embedding values.
*
*   INPUT:              buffer,  pointer to the block of integers
*   ibuf,               integer no. of integers in the block
*
*   Note:   The following are determined by reading the keyfile
*                              pair,   pointer to index pair structures
*                              no_pairs, number of pair structures
*
*   RETURN:                    nothing
*
*******************************************************************************/ static int ptable[MAXSIZE];                  /* table of pairs */
static int ptable_filled = 0;                /* flag to fill the table */
static unsigned long embed_count=0L;   /* total number of embedded bits */
```

FIG. 9 (a)

```
static struct PAIRS {                    /* structure of pallet pair data entries */
    int i;
    int j;
    unsigned long count;
}pair[MAXPAIRS];
static int no_pairs;

extern short bitgetbit(void);            /* Derek Upham's data code */
extern FILE *fpKeyFile;                                              /* pointer to the pair key
file */ void Embed_Data_Block(short *buffer,int ibuf) {
short index;
int i;
int j;
int k;
size_t inbytes=0;
if(!ptable_filled) {
    fseek(fpKeyFile,0L,SEEK_SET);        // retrieve the pair values from the keyfile
    no_pairs = 0;
    for(i=0;i<MAXPAIRS;i++) {
                                         k = sizeof(int)*fread(&pair[i].i,sizeof(int),1, fpKeyFile);
                                         if(k==0)break;
                                         inbytes += k;
                                         k = sizeof(int)*fread(&pair[i].j,sizeof(int),1, fpKeyFile);
                                         if(k==0)break;
                                         inbytes += k;
                                         no_pairs++;
                                         }
    pair[no_pairs].i = pair[no_pairs].j = 0;
    pair[no_pairs].count = 0L;
    fclose(fpKeyFile);                   // all done with the keyfile (it
could be compressed now)
    fpKeyFile = NULL;
```

FIG. 9(b)

```
for(k=0;k<MAXSIZE;k++) ptable[k] = -1;
  for(k=0;k<no_pairs;k++) {
                            index = pair[k].i - MINVAL;
                            ptable[index] = k;
                            index = pair[k].j - MINVAL;
                            ptable[index] = k;
                            }
    ptable_filled = 1;                        // the key lookup table is filled &
can be used
   } for(j=0;j<ibuf;j++)          {             // loop over each value in the buffer
                             index = buffer[j]-MINVAL;
                             k = ptable[index];
                             if(k>=0) {          // does the value match with a
key-pair element?
                                   embed_count++;
                                   if ((i=bitgetbit()) != -1) {
                                         if(i) index = pair[k].j;
                                         else  index = pair[k].i;
                                         buffer[j] = index;
                                         //buffer[j] = 35;            //
intentionally corrupt the element for display purposes
                                        }
                                   }
                             }
return;
}
```

FIG. 9(c)

```
/****************************************************************************
 *   ExtractDataBlock:  Routine to extract data from a block of integers using
 *                              the pairs in the structure pair. This code was re-
 *                              written from the
 *                              original version, to use table look-up for the
 *                              embedding values.
 *
 *   INPUT:                     buffer,  pointer to the block of integers
 *                              ibuf,    integer no. of integers in the block
 *
 *   Note:  The following are determined by reading the keyfile
 *                              pair,    pointer to index pair structures
 *                              no_pairs, number of pair structures
 *
 *   RETURN:                    nothing
 *   Version 1.10 10/15/96
 *   Copyright © 1996 M. T. Sandford II and The University of California
 *   All Rights Reserved.
 ****************************************************************************/ static int ptable[MAXSIZE];                    /* table of pairs */
static int ptable_filled = 0;                  /* flag to fill the table */
static unsigned long embed_count=0L;  /* total number of embedded bits */
static int no_pairs;
static int alldone=0;                          /* flag for completion of extraction */ extern struct PAIRS {                          /* structure of pallet pair data entries */
    int i;
    int j;
    unsigned long count;
}*pair;

extern int bitsetbit(unsigned char value);   /* Derek Upham's data code */
extern unsigned long GetFileSize(void);      /* routine to return extracted file size */
extern FILE *fpKeyFile;                       /* pointer to the pair key file */
```

FIG. 10(a)

```
void ExtractDataBlock(short *buffer,int ibuf) {
short index;
int i;
int j;
int k;
size_t inbytes=0;
unsigned long fsize = 0;

if(alldone) return;                        // nothing left to do if(!ptable_filled) {
    //fpKeyFile = fopen("keyfile", "rb");   // retrieve the pair values from the keyfile
    no_pairs = 0;
    for(i=0;i<MAXPAIRS;i++) {
                                            k = sizeof(int)*fread(&pair[i].i,sizeof(int),1, fpKeyFile);
                                            if(k==0)break;
                                            inbytes += k;
                                            k = sizeof(int)*fread(&pair[i].j,sizeof(int),1, fpKeyFile);
                                            if(k==0)break;
                                            inbytes += k;
                                            no_pairs++;
                                            }
    pair[no_pairs].i = pair[no_pairs].j = 0;
    pair[no_pairs].count = 0L;
    fclose(fpKeyFile);                     // all done with the keyfile
    fpKeyFile = NULL;
    for(k=0;k<MAXSIZE;k++) ptable[k] = -1;
    for(k=0;k<no_pairs;k++) {
                                            index = pair[k].i - MINVAL;
                                            ptable[index] = k;
                                            index = pair[k].j - MINVAL;
                                            ptable[index] = k;
                                            }
    ptable_filled = 1;                     // the key lookup table is filled & can be
used
    } for(j=0;j<ibuf;j++)                        {     // loop over each value in the buffer
                                            index = buffer[j]-MINVAL;
                                            k = ptable[index];
                                            if(k>=0) {     // does the value match with a key-
pair element?
                                            if(pair[k].i == buffer[j]) i = bitsetbit(0x00);
                                            else i = bitsetbit(0x01);
```

FIG. 10 (b)

```
                                                    if(i==-1) {
                                                        alldone = 1;
                                                        fsize = GetFileSize();
                                                        fprintf(stderr,"\n%6ld header bytes
extracted", embed_count/8L - fsize);
                                                        fprintf(stderr,"\n%6ld   data bytes
extracted\n", fsize);
                                                        fflush(stderr);
                                                    }
                                                embed_count++;
                                            }
                                        }
    return;
}
```

FIG. 10(c)

COMPRESSION EMBEDDING

This is a continuation-in-part application out of U.S. patent application Ser. No. 08/442,592, filed May 17, 1995, now abandoned.

This invention was made with Government support under Contract No. W-7405-ENG-36 awarded by the U.S. Department of Energy. The Government has certain rights in the invention.

A portion of the disclosure of this patent document contains material which is subject to copyright protection. The owner has no objection to the facsimile reproduction by any one of the patent disclosure, as it appears in the Patent and Trademark Office patent files or records, but otherwise reserves all copyright rights whatsoever.

FIELD OF THE INVENTION

The present invention generally relates to digital manipulation of numerical data compressed by 'lossy' compression methods. More specifically, the invention relates to a means for the embedding of external data into the intermediate numerical values determined by the lossy compression method.

BACKGROUND OF THE INVENTION

The use of data in digital form is revolutionizing communication throughout the world. Much of this digital data communication is over wire, microwaves, and fiber optic media. When it is necessary to transmit large amounts of data, innovative methods to minimize the communication time are required. Transmissions of digital television, for example, use data compression methods to accomplish this minimization. A class of these methods is termed "lossy compression". The class is termed 'lossy' because the compression methods reduce slightly the quality of the original data. Multi-media computing applications use lossy compression of image and audio data to improve performance and reduce data storage requirements.

In many situations, it may be of benefit to send particular secondary data along with the primary data. Secondary data could involve the captioning of television programs, identification information associated with photographs and audio signals, data to authenticate or validate the host information, data impressed as a digital watermark signature, or command data, i.e., Java byte codes, transmitted with images in the Internet.

Authentication using a separate electronic indicia is taught in U.S. Pat. No. 4,949,381; to: Pastor; issued Aug. 14, 1990, assigned to Pitney Bowes, Inc., Stamford, Conn. This application teaches another method, wherein no separate indicia is required to convey the hidden information. The machine readable secondary, or auxiliary data reside entirely within the content of the host data. The auxiliary data are invisible to humans, and require a digital key to be constructed from the host information by machines. The digital key may be protected by the use of "public key" encryption systems, such as the generally known RSA encryption system.

This application employs invisibility provided by manipulating the host information in a manner similar to the disclosures in copending application Ser. No. 08/392,642, filed Feb. 23, 1995, for DATA EMBEDDING. Auxiliary data embedded into the host information are constructed by processing machine readable, digital host data. Human readable versions of the host data, images displayed on screen or printed from the digital forms, cannot be scanned or processed to construct the auxiliary information. Data embedding as taught in the above copending application creates and manipulates a copy of the original image. The machine readable copy of the host image is manipulated to convey the added information. The amount of host information, i.e., the number of bits it contains is unchanged by data embedding, in contrast with authentication as taught by Pastor, who creates a separate, visible bit-mapped electronic indicia.

Authentication of the host data constitutes the successful construction of all or part of the auxiliary data embedded into the host information, because any modifications changing the host data representation preclude the invention.

In one embodiment of the subject invention, the auxiliary data are encrypted before the data embedding process in order to randomize the auxiliary bit stream and minimize the effect of embedding on the host data. However, the security of data embedded as taught in the above-mentioned copending application requires no decryption, owing to the noise-key used to control the embedding process.

In still another embodiment of the subject invention, the noise-key used to embed and construct the auxiliary data is encrypted using a public key encryption system such as RSA.

The auxiliary data can be embedded using methods to modify the noise component of the data as disclosed in the above-described copending application. However, lossy compression methods modify the noise component and degrade the fidelity of the original host data. This loss in fidelity destroys any information which has been embedded into the noise component of the host data, as is taught by the above-described copending application. This means that lossy compression is incompatible with prior data embedding methods. The present invention implements the principles of data embedding to achieve the embedding of an auxiliary data bit stream in host data compressed with lossy compression methods. The invention is particularly useful for embedding information required to remove a digital watermark from host data consisting of digital television or multi-media images compressed with lossy methods.

Redundancy and uncertainty are intrinsic to lossy compression methods. Two examples of lossy compression are the Joint Photographic Experts Group (JPEG) standard, and the Wavelet Scalar Quantization (WSQ) algorithm that has been adopted by the Federal Bureau of Investigation for the electronic interchange of digital fingerprint information. A similar compression standard established by the Moving Picture Experts Group (MPEG) is used for digital television and multi-media imagery. The JPEG and MPEG algorithms are based on the Discrete Cosine Transform (DCT) representation of the host data. The WSQ method is based on a representation of the host data in terms of wavelet functions. In the methods, the host data representation exists in an intermediate stage as a sequence of blocks of integer values referred to as 'indices.' At this intermediate stage, loss of fidelity occurs because the transform coefficients that represent the original data are quantized to a finite number of integer representations. The above mentioned JPEG, WSQ, and MPEG methods apply some form of loss-less compression to the integer coefficient blocks, resulting in doubly compressed data approximating the original image.

In the normal JPEG algorithm, the indices from the quantizer compress further with a loss-less entropy coder, usually a modified Huffinan compression. An alternate method taught in U.S. Pat. No. 5,187,755; to: Aragaki, issued Feb. 16, 1993; assigned to Dainippon Screen Mfg. Co., Ltd., Kyoto, Japan represents part of the coefficient blocks by means of code tables. The code tables are established before the loss-less compression step is applied. Code tables represent parts of the coefficient blocks to within the error permitted by the standard deviation in the original pixel data. The index for a code table is used in place of parts of the coefficient matrix, thereby achieving an additional improvement in the data compression. The JPEG format is represented by ISO standards DIS 10918-1 and DIS 10918-2. The code table method is incompatible with the JPEG standards, and it therefore requires a special implementation, or a revised standard. The present application does not apply to lossy compression methods using code table representations for the coefficients in a block, because the invention manipulates the indices within a coefficient block.

Redundancy occurs in all lossy compression methods because the same integer values occur many times in the compression sequence of indices. Uncertainty occurs in the integer representation because the uncertainty in the original host data is present also in its transform representation. Indeed, the above mentioned code table compression method exploits redundancy in the integer coefficients and approximates parts of coefficient blocks with members of a plurality code table. The present invention depends upon the integer index values within a code block being individually uncertain by at least one unit of value.

Derek Upham implemented a manipulation of the quantizer parity as a means for embedding information into the JPEG algorithm (JSTEG source code May 25, 1993, available electronically at: ftp://ftp.csua.berkeley.edu/pub/cypherpunks/steganography/jsteg). The modified quantizer output is passed to loss less compression, and then to the compressed image file. Kineo Matsui and K. Tanaka ("Video-Steganography: How to Secretly Embed a Signature in a Picture," International Multimedia Assoc. Intell. Prop. Project. Proc., 1994) also manipulate the parity of the quantizer output, in synchronization with a bit pattern that is embedded as a repeating digital signature. Modifying parity to add information to embed information into the JPEG indices changes their statistical distribution. Modifying the quantizer parity disturbs the performance of the loss less compression process, resulting in a significant increase in the size of the compressed file size.

In the invention, the quantizer output flows to the data embedding algorithm, where key-pairs are calculated from constraints applied to the statistical distribution of the indices. Data bits from the auxiliary data modify the quantizer output according to the key-pair value correspondence, as taught in the above-described copending application. The advantage of the invention is two-fold:

1) The statistical properties of the quantizer output determine pairs of indices that can be exchanged without affecting significantly the entropy of the indices. Thus, the embedding process is nearly adiabatic, and the loss less coding performs nearly as well as it does without embedding data.

2) The histogram analysis leads naturally to a schedule of indices, or key-pair table, that drives the embedding algorithm. The security of the embedded information is high, because the embedding is done according to key-pair values that must be known to retrieve the information.

For embedding with the invention, the quantizer output flows to the data embedding algorithm, where the key-pairs and data bits from the auxiliary data are used to modify the quantizer output.

The existence of redundancy and uncertainty in the intermediate compression indices permits a process for embedding additional, invisible information into the machine readable compressed representation of the host data. Because the expansion of the compressed data returns an approximation to the original information, the adherence to the existing standards for JPEG and MPEG compression is unaffected by embedding the additional information. The embedded information is invisible to humans viewing the image expanded from the lossy compression data, and to machines reading the coefficient indices for purposes of reconstructing the host data. The auxiliary information is constructed by a machine that processes the indices and has the requisite knowledge to interpret certain of their values, in particular ones matching the key-pair schedule entries, according to their position of occurrence in the host data. The machine required to process the embedded information, for either embedding or auxiliary data construction, can be a channel in series with, or parallel to, the hardware or software implementing the compression expansion algorithm.

The embedding of information by the invention does not increase the bandwidth required for the transmission of the compressed data because the auxiliary data reside in the identical coefficient values representing the original data. The positions of the integer values within their respective blocks of coefficients are changed to embed the auxiliary data, but this manipulation is nearly adiabatic, with consequent minimal affect on the final, loss-less compression of the coefficient blocks. One may convey thereby meaningful, new uncorrelated information invisibly in the machine readable redundant coefficients of the lossy compression representation without it ever being detected by unauthorized persons.

This invention is based on the above-described copending application, but expands the data embedding principle of that application to a new regime. Compression embedding as taught in the present application is different than the data embedding as taught in the copending application because compression embedding adds additional data by manipulating the intermediate numerical representation of the host created by a lossy compression method instead of manipulating the host data values directly, as is taught in the copending application.

It is therefore an object of the present invention to provide apparatus and method for embedding data into a digital information stream so that the digital information is not changed significantly.

It is another object of the present invention to provide apparatus and method for thwarting unauthorized access to information embedded in data compressed with lossy algorithms.

It is yet another object of the present invention to provide apparatus and method for allowing construction of an auxiliary data bit stream from a lossy, compressed digital information stream into which the auxiliary data bit stream has been embedded according to the present invention.

Additional objects, advantages, and novel features of the invention will be set forth in part in the description which follows, and in part will become apparent to those skilled in the art upon examination of the following, or learned by practice of the invention. The objects and advantages of the invention may be realized and attained by means of the instrumentalities and combinations particularly pointed out in the appended claims.

SUMMARY OF THE INVENTION

In accordance with the purposes of the present invention there is provided a method of embedding auxiliary data into host data compressed by lossy compression ratio methods that use series expansion and quantization techniques comprising the steps of creating a duplicate digital compression representation of said host data in terms of intermediate integer indices representing coefficients, the digital compression representation having certain statistical properties; creating a digital representation of the auxiliary data in the form of a sequence of individual bit values; evaluating the digital compression representation to determine pairs of integer indices differing by a specified number of units and occurring with similar frequency in the digital compression representation; replacing individual integer indices in the digital compression representation with values taken from a digital key comprising a schedule of the pairs of integer indices in order to embed individual bit values corresponding to the sequence of individual bit values of the auxiliary data; and outputting the digital compression representation with the auxiliary data embedded into a file format specified for the compressed data.

In another aspect of the present invention, and in accordance with its objects and principles, a method of constructing embedded auxiliary data from a machine readable lossy digital compression representation containing integer indices comprises the steps of creating a look-up table defining a correlation between the integer indices and the elements of a key-pair table; matching the decoded integer indices from the lossy digital compression representation with entries in the look-up table, for the purpose of determining correspondence of the integer indices with elements in the key-pair; constructing the auxiliary data according to the correspondence in the look-up table between the integer indices and an element in the key-pair table; validating the content and correctness of the auxiliary data by examining header data constructed from the correspondence between the integer indices and the key-pair values; and interpreting the auxiliary bits as data unrelated to the lossy compressed data.

In yet another aspect of the present invention and in accordance with its objects and principles, apparatus for embedding auxiliary data into individual frames of host data having integer indices of certain values and frequencies of occurrence compressed by lossy compression ratio methods that use series expansion and quantization techniques comprises buffer storage means receiving the individual frames of host data for entropy decoding, modifying and momentarily storing the integer indices of the individual frames of host data, entropy coding said modifications to the integer indices of the individual frames of host data, and outputting the entropy coded modifications to the integer indices of the individual frames of host data. Histogram analysis means receive the entropy coded modifications to the integer indices of the individual frames of host data for processing a statistical relationship between the frequency of occurrence and the value of the integer indices of the individual frames of host data, identifying embedding pair candidates in the individual frames of host data, and outputting the embedding pair candidates. Key-pair table means receive the embedding pair candidates for creating a key-pair table for each of the individual frames of host data, and outputting the embedding pair candidates as a randomized table. Compression embedding means receive the embedding key pair table, the integer indices from the individual frames of host data retained in the buffer storage, and the auxiliary data for embedding the auxiliary data and the key-pair table into the individual frames of host data and outputting an embedded stream of individual frames of host data.

In still another aspect of the present invention and in accordance with its objects and principles apparatus for constructing auxiliary data and a key-pair table embedded into individual frames of host data compressed by lossy compression ratio methods that use series expansion and quantization techniques comprises look-up table means receiving the key-pair table from the individual frames of host data for extracting the key-pair table and outputting a key-pair index corresponding to each of the integer indices from the individual frames of host data in a buffer storage. Auxiliary data construction means receive the key pair table for each of the individual frames of host data and the integer indices from the individual frames of host data stored in the buffer storage for using the key pair to construct the auxiliary data from the individual frames of host data and outputting an auxiliary data bit stream.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 6 is a listing of computer code used for determining the pairs of integer indices suitable for embedding data.

FIG. 7 is a listing of computer code used for eliminating duplicate host data pairs.

FIG. 8 is a listing of computer code that performs a randomization of the pairs of indices in order to provide security against unauthorized access to the embedded information.

FIG. 9 is a listing of computer code that performs the actual embedding of auxiliary data into the compression representation.

FIG. 10 is a listing of computer code that constructs auxiliary data from the key-pair values and the lossy compression host data indices.

DETAILED DESCRIPTION

Figure 1:
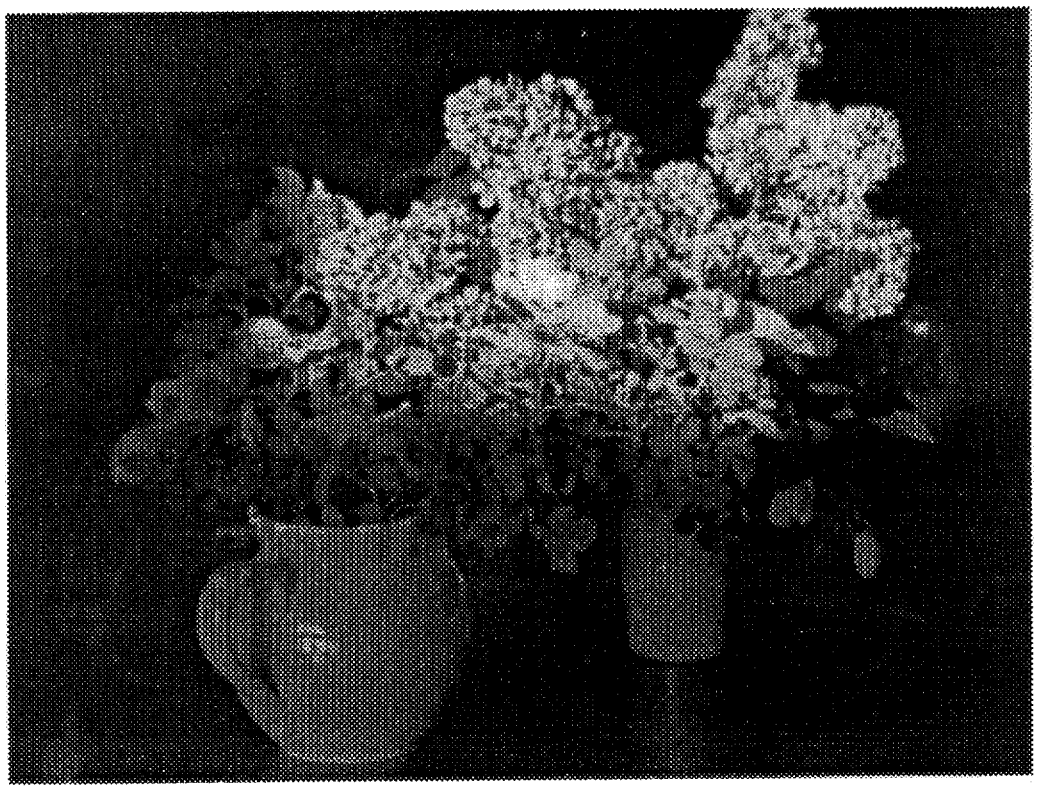
FIG. 1 is a reproduction of the gray scale image example used to describe the invention.

The present invention allows data to be embedded into information compressed with a lossy method without naturally discernible alteration of the content of the compressed information or the meaning of the embedded data constructed from the compressed information. This is made possible because of the technique of the present invention, in which similar integer indices in a lossy compression representation are re-ordered according to the desired embedded or implanted information. The lossy compression examples are digital images compressed using JPEG and WSQ methods. The resulting images contain embedded information without that information being readily discernible to an unauthorized observer.

The JPEG method is given in an article by Gregory K. Wallace, "The JPEG Still Picture Compression Standard," Communications of the ACM, April 1991 (vol. 34 no. 4), pp. 30–44. The JPEG algorithm is used primarily for compressing digital images. A PostScript file containing a revised version of the article is available for electronic reference at: ftp.uu.net, graphics/jpeg/wallace.ps.Z. A somewhat less technical, more leisurely introduction to JPEG can be found in The Data Compression Book by Mark Nelson, published by M&T Books (Redwood City, Calif.), 1991, ISBN 1-55851-216-0. A detailed textbook about JPEG is JPEG Still Image Data Compression Standard by William B. Pennebaker and Joan L. Mitchell, published by Van Nostrand Reinhold, 1993, ISBN 0-442-01272-1.

The Independent JPEG-Group's C-language source code is available electronically from: ftp.uu.net (Internet address 137.39.1.9 or 192.48.96.9). The most recent released version can always be found there in directory graphics/jpeg.

The WSQ method as applied to compressing digital fingerprint images was given by J. N. Bradley and C. M. Brislawn, "The wavelet/scalar quantization standard for digital fingerprint images," Proc. of the 1994 IEEE Intern. Symp. on Circuits and Systems, vol. 3, pp. 205–208, 1994, and by J. N. Bradley, C. M. Brislawn, and T. E. Hopper, "The FBI wavelet/scalar quantization standard for gray-scale fingerprint image compression", Proc. SPIE, vol. 1961, pp. 293–304, April, 1993. Documentation for WSQ compression is available through Jonathan N. Bradley, Los Alamos National Laboratory, P.O. Box 1663, MS-B265, Los Alamos, N. Mex. 87545, and electronically from the Internet FTP site "ftp.c3.lanl.gov" in directory/pub/WSQ.

The JPEG method processes the host image in pixel blocks specified to the algorithm at the time the indices are calculated. The WSQ method compresses the host image by passing it through a series of multirate filters. In both the JPEG and WSQ algorithms, the image host data exist in an intermediate stage as a sequence of integer (16-bit signed) indices. The indices represent an image originally presented in a standard digital format. The characteristic of lossy compression that makes possible the invention is redundancy and uncertainty. Each integer index occurs typically many times in the compressed representation, and each index is uncertain in value due to uncertainty in the host data. The present invention creates a histogram of the integer indices in the compressed representation. This histogram shows the probability density of the integer values in the representation. The histogram plots the number of times a particular value occurs versus the value. For JPEG compression, values in the range ±1024 are sufficient, and for WSQ compression values in the range ±4096 are considered. A particular histogram of index values will depend on the image content, but both compression methods concentrate many values in a pattern symmetrical about 0.

FIG. 1 is a reproduction of the gray scale image example. The invention works equally well with color images. The gray scale image example in FIG. 1 does not represent a limit to the application of the invention. The gray scale example image is reproduced in FIG. 1 at reduced scale and quality to facilitate printing. The reproduction in FIG. 1 demonstrates only the nature of the image example, and does not convey a representation of the image quality appropriate to the invention. Images expanded from compression representations with data embedded are visually identical to those expanded from unmodified compression data.

Figure 2:
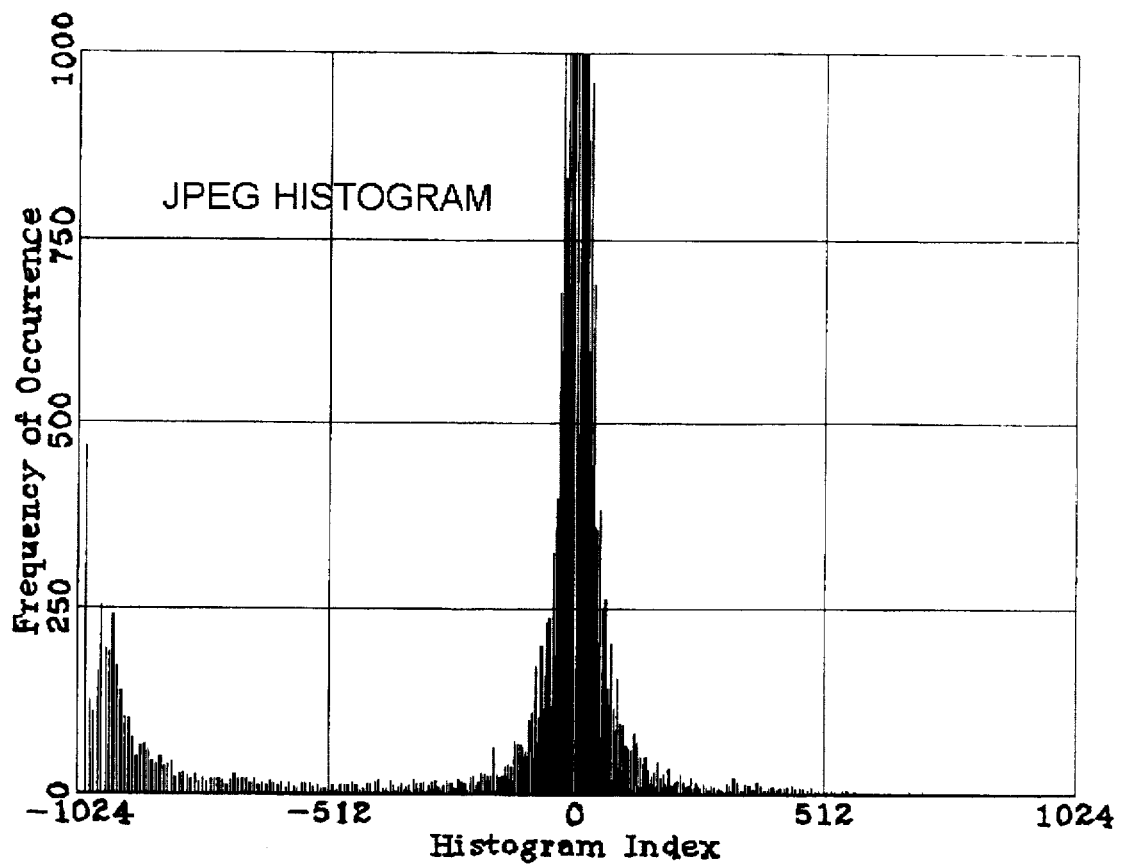
FIG. 2 is a plot of the histogram of the integer representation of the image in FIG. 1 compressed with the JPEG method.
Figure 3:
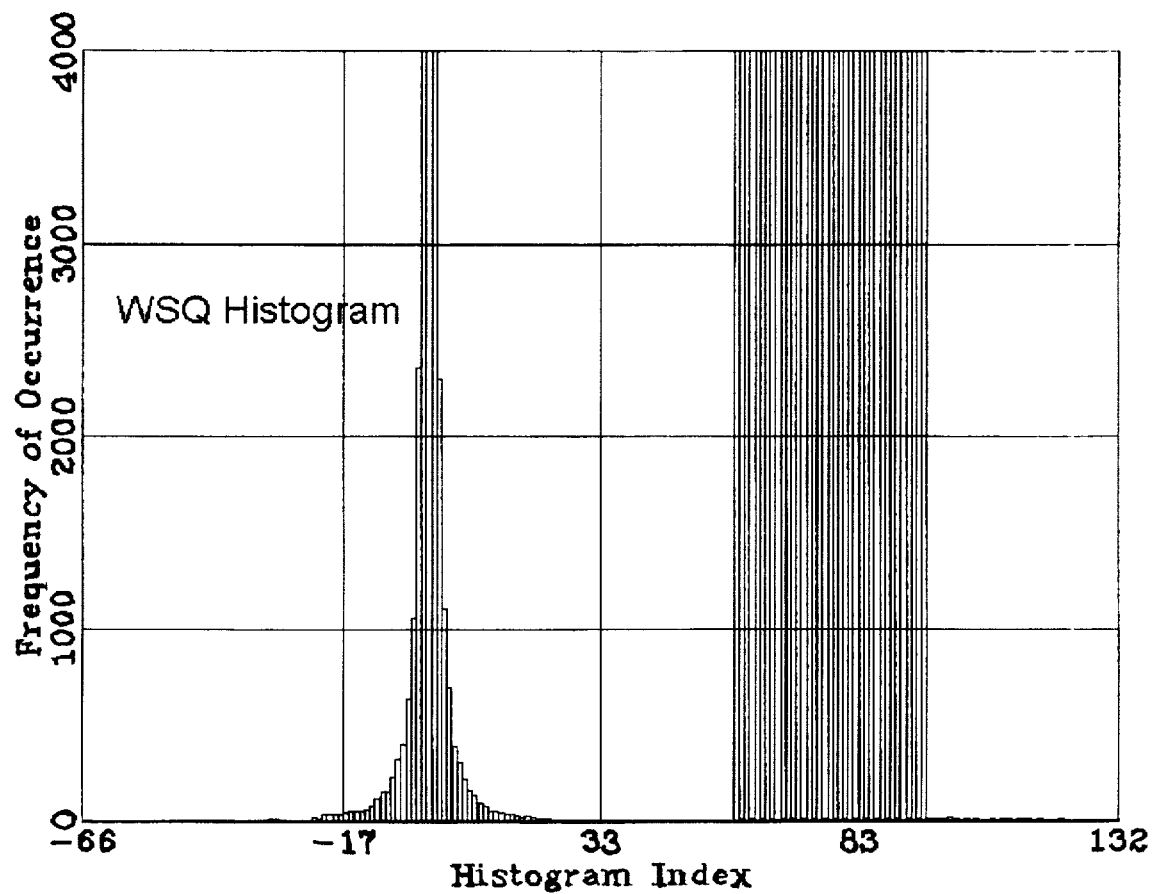
FIG. 3 is a plot of the histogram of the integer representation of the image in FIG. 1 compressed with the WSQ method.

Histograms of the indices for the image example in FIG. 1 are shown in FIGS. 2 and 3, for JPEG and WSQ compression, respectively. FIG. 2 shows the histogram for the JPEG compression representation, for the image sample shown in FIG. 1, and compression ratio about 12:1. The file size for the JPEG version of FIG. 1 is 42953 bytes. Analysis of this image according to the invention identifies 50 pairs of values in the histogram, totaling 3573 bytes of embedding space.

FIG. 3 shows the histogram for the WSQ coefficient representation of the image sample shown in FIG. 1, and compression ratio about 20:1. Analysis of these coefficients according to the invention identifies 37 pairs of values in the histogram, totaling 471 bytes of embedding space. The WSQ histogram contains fewer coefficients than produced by the JPEG method owing to the larger compression ratio, but the invention nevertheless permits embedding information into the compressed representation.

Figure 4:
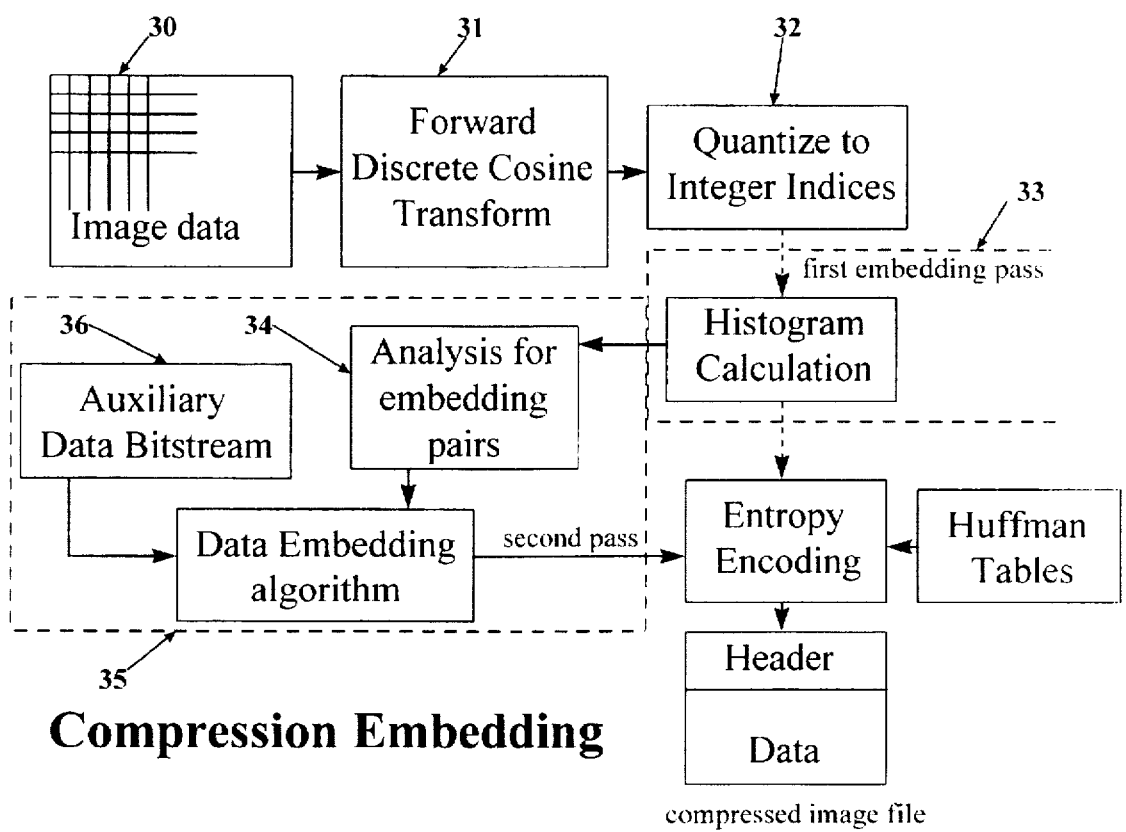
FIG. 4 is a block diagram illustrating the processes used in the embedding of data into the integer indices of a lossy-compressed data host.

The actual embedding of the auxiliary data into the compressed representation of integer indices in the JPEG algorithm is a two-part process, the steps of which are shown in FIG. 4. The steps of the invention are shown in the dashed-outline portion of FIG. 4.

The JPEG algorithm divides the original, host image 30 into blocks of 8×8 pixels. The pixel values within a block are converted to coefficients in a discrete cosine transform 31, and the coefficient values converted to indices by a quantizer 32. In the first invention step 33, the quantizer indices, representing the transform coefficients, are examined to identify pairs of the integer indices having values that occur with approximately the same statistical frequency, and that differ in value by only one unit. A key-pair table 34 is constructed from the histogram of the quantizer indices. The order of the integer indices key-pair values is randomized to generate a unique key sequence that cannot be duplicated by an unauthorized person.

In the second invention step 35, the pairs of indices identified from the histogram analysis are used in a second pass through the image to re-order the quantizer indices in accordance with the correspondence between the key-pair values and the bit values in the sequence of auxiliary data bits 36. The key-pair sequence 35 is saved separately, as a small binary data file.

Figure 5:
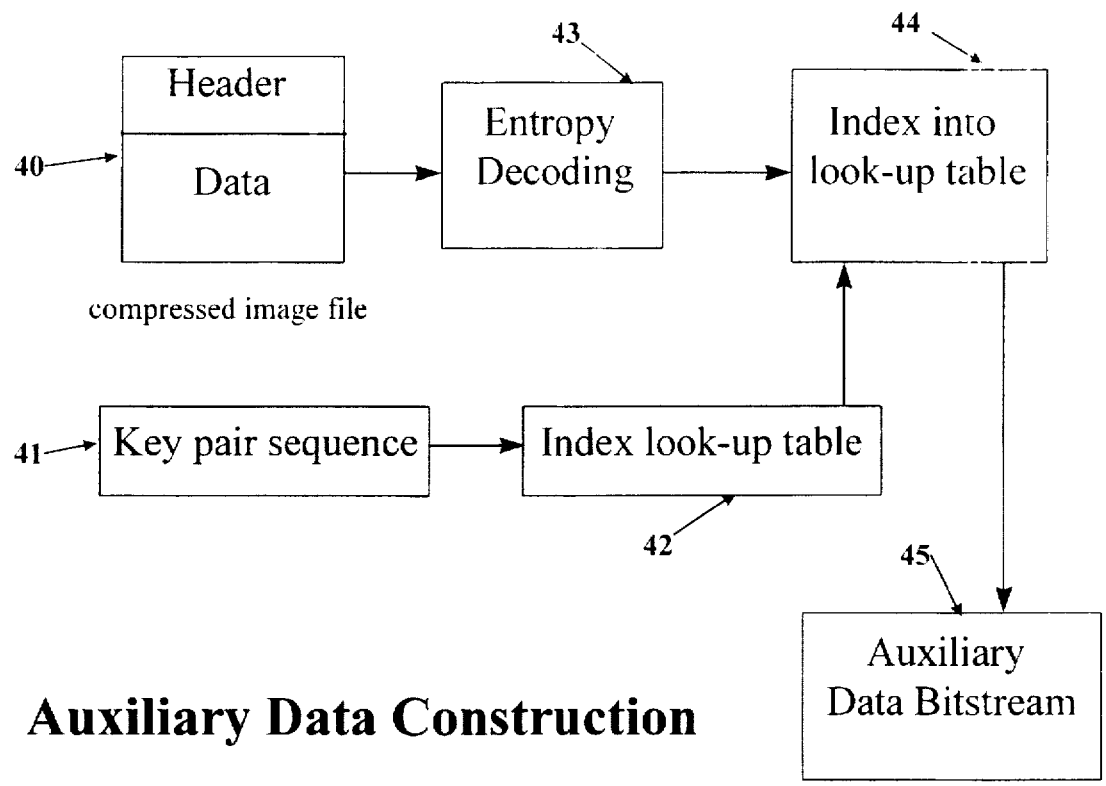
FIG. 5 is a block diagram illustrating the construction of auxiliary data from the key-pair values and the index values in the lossy compressed data host.

The method for constructing auxiliary data from a key-pair schedule and the indices in a lossy compressed data host is shown in FIG. 5. The key-pair sequence 41 of pairs of index values is recovered from the compressed data file 40 as taught in the above-described copending application, or it is supplied as information separate from the compressed data. The key-pair table 41 specifies the pair-values of indices differing by one unit in value, and the order in which indices are used to construct the auxiliary data. The indices of the pairs in the key-pair schedule are used to construct a look-up table 42. For every quantizer index value that is possible, the value of a corresponding key-pair index is given. Index values having no correspondence with a key-pair, i.e., quantizer index values that are not used for embedding are assigned the index value −1.

The lossy compressed data residing in the host file 40 are processed with the appropriate entropy decoder, usually the Huffman table algorithm 43, to recover the quantizer index values. The quantizer index value is used as an entry in the look-up table to determine the key-pair corresponding to the index value. If the look-up table entry is −1, there is no corresponding key-pair and the next value from the entropy decoder is examined. If the look-up table indicates a correspondence, the index value is compared with the corresponding key-pair values (44). The key-pair value matching indicates the auxiliary bit value to be added to the bit stream 45 being constructed. If the index value is identical to the first element of the key-pair, the auxiliary bit value is zero, and if the index value is identical to the second key-pair element, the auxiliary bit value is one.

As the quantizer index values flow from the Huffinan decoder 43 and the look-up table is applied 44, the auxiliary data bit stream 45 is constructed. The key-pair data are used first to construct header information. The header information specifies the length and the file name of the auxiliary data, and serves to validate the key. If the compressed host file contains no embedded information, or if the incorrect key sequence is used, the header information cannot be interpreted correctly. However, successful interpretation of the header data guides the construction of the auxiliary data.

As shown in FIG. 5, the invention constructs the auxiliary data 45 without requiring an expansion of the lossy compressed data to a host image, i.e., there is no particular correspondence of the values in the look-up table 42 with the pixel values in the decompressed image. If decompression to an image is required, the auxiliary data construction method can proceed as an optional, parallel process. However, if construction of the auxiliary data 45 alone is required, the invention proceeds as shown in FIG. 5.

The principle of data embedding according to the present invention involves the rearrangement of certain intermediate, integer values in a lossy compression representation in order to encode the values of the auxiliary data which is to be added. For the purposes of this description of the invention, consider the compression representation to consist of a sequence of integer values or indices. Further assume that any intermediate index value is uncertain by ±1 unit in value. The frequency of occurrence or histogram value of a certain index i is f(i).

Two values i and j in the table of indices are candidates as embedding pairs if:

$$|i-j|=1 \qquad 10$$

Index values meeting the criterion of Equation 10, and occurring also in the representation with f(i)−f(j)<δ, where f(i) and f(j) are the probability of occurrence of adjacent intermediate index values, and δ is the tolerance imposed for statistical equality, are candidates for embedding use. The values i and j meeting this constraint constitute a pair of index values $p_k$. There are k=0, 1, 2, . . . $N_p$ such pairs in the compression representation, giving a total number M of embedding bits:

$$M = \sum_i f(i) + \sum_j f(j). \qquad 20$$

The summations of i and j run over a limited range of the intermediate indices. In the example given here, for JPEG compression, the summation limits are specified at ±1024.

It is now helpful to refer to FIG. 6, wherein a partial listing of computer code in the C-language is printed. On the first pass through the lossy compression algorithm, the histogram table is filled with the number of occurrences of each index value, in the range from MINVAL to zero, and from zero to MINVAL (positive). For the JPEG algorithm, the range is (−1024,+1024). In the histogram analysis, the indices falling within the range ±HISTLIMIT are excluded from analysis as embedding pair candidates, because the low frequency coefficients affect markedly the appearance of the reconstructed image. The routine jhistgm( ) in FIG. 6 accepts three calling arguments (line 57 in FIG. 6, page 2). The first argument is a pointer to the histogram table that was valued during the first pass through the lossy compression algorithm. The second two arguments are pointers to the table of key-pairs, and the number of pairs. The latter two arguments are filled in value by the routine.

The histogram constraint applied in the loop starting at line 66 determines the candidate pairs. A detailed discussion of this loop code is given by Sandford and Handel in "The Data Embedding Method," Los Alamos National Laboratory report LA-95-2246UR, in Integration Issues in Large Commercial Media Delivery Systems, Proc. SPIE, 2615, 226, ed. A. G. Tescher and V. M. Bove, Jr. (Philadelphia, Pa. 23–26 Oct., 1995). Briefly, the pair values must differ by no more than one unit in value, and they must occur with a difference in frequency less than the average frequency for the two index values. FIGS. 2 and 3 show the histogram data for sample JPEG and WSQ compression representations. The code in line 76 in FIG. 6, page 2, compares the absolute difference of the frequency of occurrence f(i) and f(j) with the average value of the two occurrence frequencies. Pairs differing by less than the average value are accepted in this example.

This simple selection scheme prevents an artificially large modification to the indices in the lossy compression representation. For example, if f(i)=1000 and f(j)=300, the absolute difference is 700 and the average is 650. This pair would be rejected as an embedding candidate. However, if f(i)=1000 and f(j)=750, the absolute difference and the average are 250 and 875, respectively, and this pair would be accepted. This, or a similar scheme for selecting pairs for approximate equality of their component's frequency of occurrence minimizes the effect of embedding on the performance of the entropy coding algorithm. Additionally, it minimizes the perceptible differences in the image expanded from the compressed representation containing embedded data.

The pairs selected from the histogram are stored in the data structure array element pair[j] in lines 77,78, and 79 (FIG. 6, page 2). In the example in FIG. 6, the data structure permits MAXPAIRS pairs to be selected. The structure element pair[j].count contains the total number of occurrences of the (i,j) values in the histogram table. Line 90 (FIG. 6, page 3) uses the routine duplicate( ) to remove duplications from the pair table. The return value is the total number of pairs, no__pairs. The loop starting at line 91 calculates Isum, the total number of bits that can be embedded into the compression indices. The variable M, in Equation 20 defines the calculation performed in the loop starting at line 91.

The total amount of embedding space is tested against the size of the auxiliary file plus the size of the header in line 105 (see D. Upham 1993 for details). If the total embedding bit count is less than the amount needed to store the auxiliary file and its header, an error message is printed and the number of pairs value is set to zero.

If embedding space sufficient to hold the auxiliary data exists, then the number of pairs found by the analysis is reduced to the minimum number required to hold the auxiliary information. For Upham's (1993) method of quantizer parity modification, the index modifications cease after the auxiliary file is embedded. Thus, there is a strong potential for a transition in image quality at the point in the image where the pixel blocks cease to be modified. In the invention, the pair values chosen for embedding exist throughout the image, in nearly all of the coefficient blocks. The loop to reduce the number of embedding pairs begins at line 111 in FIG. 6, page 3.

After trimming the number of pairs, a routine is called to scramble the pair values. This routine performs two functions. It randomizes the sequence of pair values and it randomizes the correspondence between the auxiliary bit values and the elements within a key-pair. In the implementation shown in FIG. 6, the pair order is not important because the auxiliary data bits are embedded sequentially into whichever is the next index value matching any pair in the key. To implement the order of the pairs in the key into the embedding process, the auxiliary data must be partitioned into blocks of bits, with each block corresponding to a particular key-pair.

However, the order of the elements within a key-pair is randomized, and this affects the embedding process. For example, if the first key-pair has elemental values (4,5), then the occurrence of an index value of 4 is taken to signify a zero-bit in the auxiliary file, and the occurrence of a 5, a one-bit. For another pair, say (8,9), the randomization might reverse the interpretation. Thus the pair would contain the elemental values (9,8) and 9 would correspond to a zero-bit in the auxiliary data. It is insufficient to know only the key-pair values. One must know also the order in which the values are assigned to correspond to auxiliary data bits, and if the auxiliary data is embedded in blocks of bits, the sequence in which the key-pairs correspond to the blocks.

The embedding process ignores completely the contribution the index values make to the compression representation. In JPEG compression, the values represent the coefficients in a discrete cosine transform performed over pixels in a square block of the image data. Usually, 8×8 pixel blocks are used, but the details of the transform and the tiling of the image data are irrelevant for the invention. In WSQ compression, the indices are determined by quantizing the discrete wavelet transform coefficients which are calculated by repeated applications of a multirate filter bank. Again, details of the wavelet calculations and the sampling size are ignored in the selection and use of the embedding pairs.

Depending on the details of the selection algorithm, the key-pairs found can include generally redundant values. The same index value i, is found perhaps in several different pair combinations. Because multiple pairs cannot contain the same index entry, due to each pair combination of index values having to be unique, it is necessary to eliminate some pairs.

Referring now to FIG. 7, the code fragment listed therein illustrates the manner in which duplicate pairs are eliminated by a separate routine. First, the histogram of the image is used to calculate the total number of occurrences of key-pair structure elements, with the code in FIG. 6. The key-pair selection algorithm given in FIG. 6 results in pairs being selected in ascending index order. Before rejecting some pairs, the pairs are sorted in line 23 of FIG. 7, page 1 by order of decreasing frequency of occurrence value, pair[j].count. Sorting the pairs by occurrence frequency before rejecting duplicate pairs minimizes the number of pairs needed to embed a particular auxiliary data bit stream. The nested loops beginning at line 24 of FIG. 7, page 1 reject duplicate pair values containing the fewest occurrence frequencies. The routine revises the pair structure elements in the loop starting at line 47 (FIG. 7, page 2) and returns the new *no_pairs value.

The security of the embedded data is increased significantly if the pair values are arranged into random order. Randomizing the order of the pair values is part of this invention and follows the code listing in FIG. 8. Randomizing is accomplished by rearranging the pair values according to a randomly ordered data structure. Two routines serve to randomize the key-pair values. The routine scramble( ) starts at line 20 in FIG. 8, page 1, and the routine jumble( ) starts at line 74 in FIG. 8, page 2. An ordered sequence of integers in the array named index[] is randomized by the jumble( ) routine. The random indices are used to re-order the key-pairs in a loop starting at line 34. The re-ordered data structure replaces the original key-pair data in line 39. In another loop starting at line 46 in FIG. 8, page 2, the correspondence of the pair elements with the auxiliary bit values is randomized.

In the jumble( ) routine, the structure named pts contains elements $pts[k].i,k=0,1,2,\ldots,no\_pairs$; and $pts[k].gamma$, $\gamma_1, \ldots \gamma_k, \ldots \gamma_{no\_pairs}$, where the $\gamma_k$ values are uniformly random on (0,1). The structure values are assigned in the loop starting at line 82 in FIG. 8, page 2. The standard library routine qsort( ) is used to sort the data structure pts[]. Putting the random element values into ascending order randomizes the index element of the structure. The random index values are used with the pair structure elements calculated and sorted as indicated above, to re-order the table to give random pair ordering.

The actual embedding of auxiliary data into a compression representation consists of rearranging the order of occurrence of the redundant indices. A fast embedding implementation results by using a table look-up in place of the exhaustive search that was given previously in the above mentioned work by Sandford and Handel (1995). FIG. 9 contains the code for the Embed_Data_Block( ) routine. The routine includes several static variables (FIG. 9, lines 38–40, page 1; lines 44–49, page 2). The variable ptable[] is an array that contains the index of the pair that corresponds to any value of the quantizer output, also an index.

The arguments to the routine entry at line 55 in FIG. 8, page 2, are a pointer to a buffer containing quantizer index values and the number of values that are to be processed. To find the embedding pair structure that corresponds to any quantizer output value, the value is offset by the minimum amount and used as an index into the ptable[] array. The value taken from ptable[] is the index to the correct pair of embedding values. Values in the ptable[] set to −1 indicate there is no correspondence with embedding key-pair values. Thus, quantizer values giving negative ptable[] values are ignored, and those giving ptable[] values greater than, or equal to zero, are used to embed one bit of auxiliary data. A static variable named ptable_filled is used to indicate that the ptable[] array must be initialized from the key. The test at line 61 in FIG. 9, page 2 permits reading the binary key-pair file and setting the ptable[] values.

Data embedding is accomplished by the loop starting at line 97 in FIG. 9, page 3. For each quantizer index value in the input buffer, the data embedding algorithm (Sandford and Handel 1995) is applied. The routine bitgetbit( ) (see Upham's 1993 JSTEG code for details) supplies the value of the next bit in the header or the auxiliary data file. Upon exhaustion of the auxiliary bits, the return value (line 103) is −1, and the embedding is completed. The commented line 107 is activated if it is desired to generate a 'marked' output image that shows the locations in the host data that are used by the key-pair values.

The key-pairs selected for embedding contain the index values to be used in the rearrangement. It is important to realize that the numerical values used for embedding data are the index values already occurring in the compression representation. The maximum pair table size permitted depends upon the compression representation. For JPEG compression, FIG. 2 shows the index values concentrate near the origin and 50 to 100 pair values are adequate. For WSQ compression of digital fingerprints, the index values spread over a larger spectrum and more pairs are required.

A consequence of the histogram constraints used to determine the key-pairs is that the current invention alters the entropy in the DCT or WSQ coefficients only slightly. Thus, the efficiency of loss less compression is largely unaffected by embedding auxiliary data into the indices values.

In the embedding process of the present invention, the coefficients calculated by the compression algorithm are manipulated in the order they appear from the compression scheme used to generate the representation, JPEG and WSQ for the examples herein. The embedding process flows concurrently through the sequence of auxiliary data bits and the compression indices. Upon identifying a compression index matching one of the pair table values, the next bit in the sequence of auxiliary data is examined to determine if the index is set to the pair[k].i value (embedding a 0), or set to the pair[k].j value (embedding a 1). The key-pair table is processed sequentially, in the order found after it was randomized by the code in FIG. 8.

The standard "Lena" test image is used to compare the results of the invention with JPEG baseline compression and quantizer parity steganography as implemented by Upham (1993). A 1288-byte test file (jembed.obj) is used as the auxiliary data, and the identical header procedure is implemented for the comparison.

Table 1 gives the file sizes for the original Lena image (lena_rgb.tga), for JPEG baseline compression of the original 24-bit Truecolor image (lena.jpg), for quantizer parity steganography with the JSTEG method (lenau.jpg), and for the invention (lenax.jpg). The Truecolor image compresses to the baseline JPEG standard with ratio 18.88:1 from the original size. With 1288 bytes embedded (3% of the compressed size), quantizer parity steganography increases the compressed file size by 801 bytes (1.9%), giving 18.52:1 compression ratio. The invention increases the file size 16 bytes (0.038%) giving 18.87:1 compression ratio. Quantizer parity steganography increases the compressed file size by 62% of the auxiliary file size. The present invention increases the compressed file size by 1.2% of the auxiliary file size. Thus, the Lena test image demonstrates that the present invention affects minimally the compression efficiency of the JPEG algorithm.

TABLE 1

Test Images for 1288 bytes

| file name | file size (bytes) |
|---|---|
| lena_rgb.tga | 788,019 |
| lena.jpg | 41,747 |
| lenau.jpg | 42,548 |
| lenax.jpg | 41,763 |

The construction of auxiliary data from a lossy compressed host containing embedded data is achieved by processing the entropy decoded quantizer coefficients with a look-up table. FIG. 10 gives the listing of code to construct auxiliary data from the quantizer indices. The routine named ExtractDataBlock( ) processes a buffer of quantizer indices and constructs the auxiliary bit stream associated with the key-pair values. The routine uses static variables (see lines 19 to 23 in FIG. 10, page 1) for the look-up table ptable[], a flag named ptable_filled to signify that the ptable[] array requires filling from the key-pair schedule, and a variable named embed_count to count of the number of auxiliary bits constructed. The sub-routine begins at line 43 in FIG. 10, page 2, and it accepts two arguments. The first argument is a pointer to the buffer containing integer values of the quantizer indices, and the second argument specifies the number of values in the buffer.

If the ptable[] look-up array requires filling, the key-pair schedule is read from a binary data file at line 57 in FIG. 10, page 2, and the look-up table is filled with indices indicating the correspondence between the key-pair values and the quantizer indices. The loop starting at line 81 in FIG. 10, page 2 processes the quantizer indices in the input buffer. If a correspondence between a quantizer index value and an entry in the key-pair table exists, the quantizer index is tested against the key-pair value elements to determine if the auxiliary bit is zero or one. The routine bitsetbit( ) is used to add one bit of the appropriate type to the auxiliary bit stream being constructed (see Upham 1993 for details). The bitsetbit( ) routine returns −1 when the auxiliary data file is completely constructed. The return value is tested at line 88 in FIG. 10, page 3.

Owing to the uncertainty introduced by randomizing the order of the key-pair table, the auxiliary data are secure against unauthorized construction from the compression representation. Indeed, detecting the presence of embedded data is difficult, if not impossible, because the only metric known to us for such detection is a statistical analysis of the compression representation indices. Because the invention affects the statistical properties only slightly, it leaves no characteristic signature revealing the presence of embedded information.

As previously described, the ordered pairs of index values selected for embedding constitute the "key" for construction of the auxiliary data from the compressed image. The listings illustrated in FIGS. 6 through 10 demonstrate how embedding analysis exploits redundancy and the statistical uncertainty in the compression representation to construct a look-up table of key-pairs of index values. The key-pairs are required for constructing the auxiliary data, but they cannot be generated by analyzing the compressed image representation after the embedding process is completed. The invention retains the one-time-pad encryption properties inherent in data embedding as disclosed in the above-described copending application, and incorporates the same high security to the embedded bit stream.

As for data embedding as disclosed in the copending application, another way of protecting the pair table key is to encrypt it using public-key or another encryption process. The present invention permits an encrypted key to be placed into the compressed file, preventing extraction by unauthorized persons.

Embedding auxiliary data into the compression representation slightly changes the statistical frequency of occurrence of the index values. If the auxiliary bit sequence is pseudo-random, the frequencies of occurrence for the index pairs i and j are nearly equal after embedding. Equalizing the histogram reduces entropy somewhat, and the entropy coding portion of the compression algorithm is found often to operate with slightly greater efficiency, increasing the effectiveness of the lossy compression method. Thus, even if no auxiliary information is to be embedded, equalizing the statistical properties of the histogram pairs improves the compression ratio for lossy methods. Embedding pseudo-random, or white noise to improve compression is part of this invention.

Figure 11:
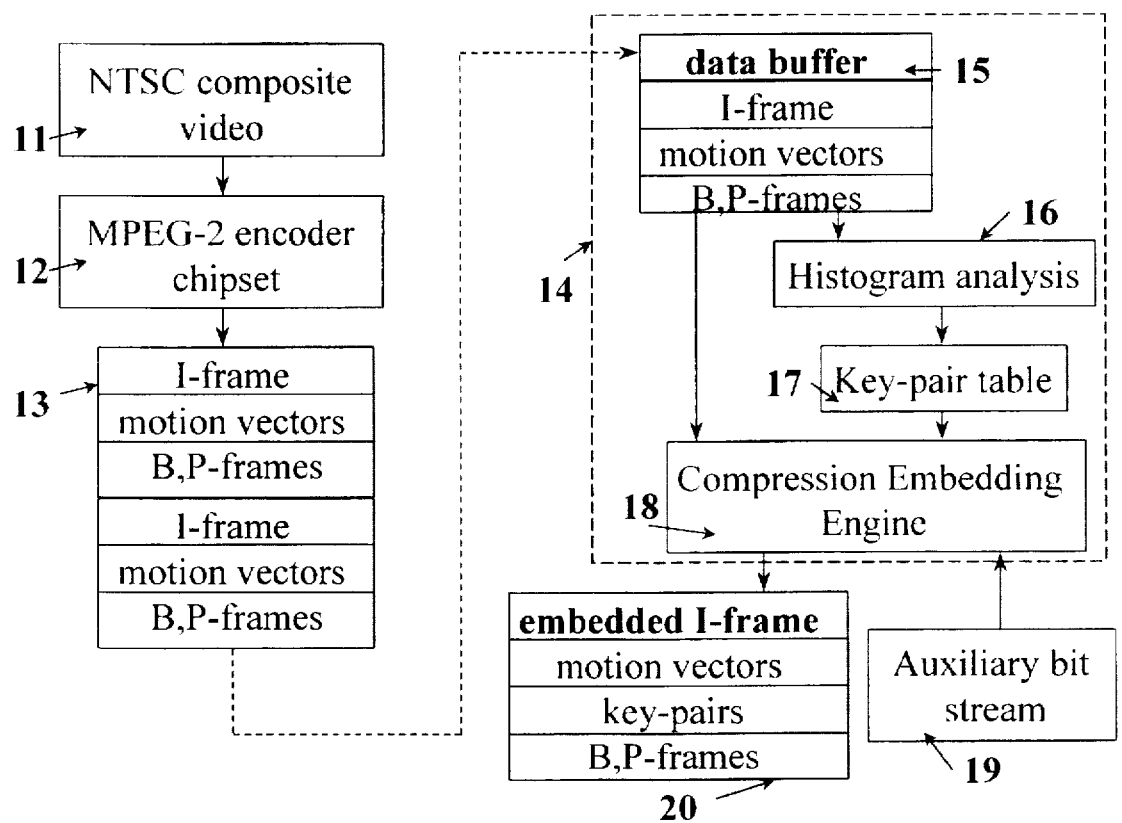
FIG. 11 is a block diagram illustrating the embedding method of the present invention in concert with lossy compression hardware.

The present invention can be implemented into existing lossy compression machines, as shown in FIG. 11. In the upper left of FIG. 11, a standard, composite video signal 11 is input to encoder chipset 12 which encodes composite video signal 11. The binary output 13 of encoder chipset 12 consists of sequences of Inter-frames (I-frames), motion vector information, and Backward- and Forward-predicted frames (B,P-frames) and, when auxiliary information is to be embedded, passes via the dashed path to buffer 15 of embedding chipset 14.

Embedding chipset 14 consists of the functions within the dashed box in FIG. 11. Embedding chipset 14 provides the functions which implement the present invention. As illustrated, buffer 15 entropy decodes, modifies and momentarily stores the integer indices of the individual frames of host data in preparation for the subsequent embedding procedure. The modification of the integer indices is conducted as described hereinabove in this specification, after which buffer 15 entropy codes the modifications to the integer indices. These modified integer indices are then output to histogram analysis 16, where the statistical relationship between the frequency of occurrence and value of the modified integer indices is processed in order to identify appropriate embedding pair candidates. These embedding pair candidates are output to key-pair table 17. Key-pair table 17 processes the embedding pair candidates to generate a key-pair table for a frame of binary output 13 which is stored in buffer 15.

Compression embedding engine 18 receives each frame of buffered binary output 15 as well as the output of key-pair table 17 and auxiliary bit stream 19. Compression embedding engine 18 embeds auxiliary bit stream 19 into the I-frame indices of buffered binary output 15, and the modified I-frame indices are compressed along with the key-pairs to produce embedded MPEG-2 bit stream 20

The processing time for embedding auxiliary data with the present invention is less than the time required to encode an I-frame and its associated motion-predicted frames (B- and P-frames), thereby maintaining the output rate of the MPEG-2 data stream. The key-pair table for the I-frame is inserted into the motion prediction portion of the MPEG-2 data, or it is added as a fictitious frame. Thus, the key-table data appear as an MPEG-2 coding error that is ignored by MPEG-2 decoding machines.

It should be understood that, although FIG. 11 illustrates chipset 14 for implementing the present invention, the functions of chipset 14 could also be implemented in circuit board circuitry. Such implementations could be useful for limited applications of the present invention.

Figure 12:
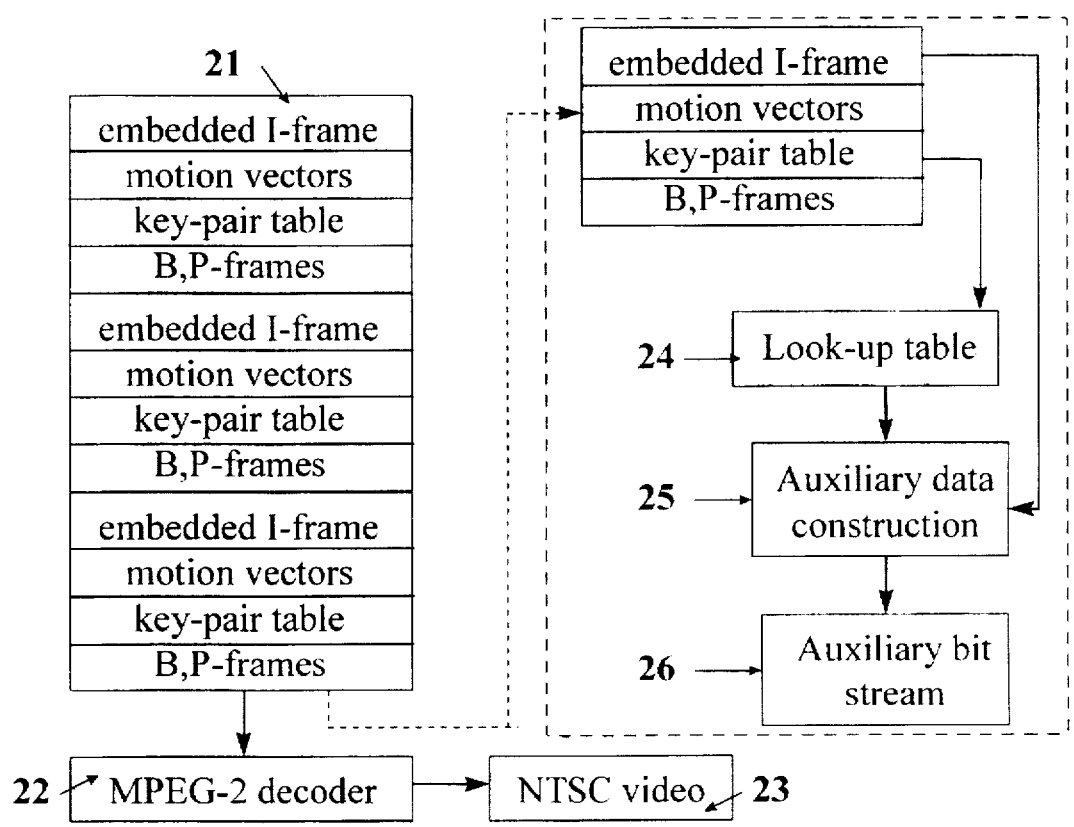
FIG. 12 is a block diagram illustrating the construction of auxiliary data in hardware according to the present invention.

In FIG. 12, apparatus for constructing auxiliary data from an embedded MPEG-2 bit stream is illustrated. The embedded MPEG-2 signal 21 is processed in parallel with a conventional MPEG-2 decoder 22 that generates composite NTSC standard video 23 for viewing. The present invention, in the parallel leg within the dashed box in FIG. 12, obtains the key-pair table from the MPEG-2 entropy-decoded bit stream data and generates a look-up table 24 from the key-pair table to permit processing the embedded I-frame integer indices by auxiliary data construction 25. Auxiliary data construction 25 outputs auxiliary data stream 26.

Depending upon its content, auxiliary data stream 26, so constructed, can be used to correct or augment the NTSC decoded signal 23, or data stream 26 can be used for any other predetermined purpose. As an alternative to the stand-alone chipset or circuit board manifestation of the present invention illustrated within the dashed box in FIG. 12, the invention can be incorporated into MPEG-2 decoder 22, in order that auxiliary data stream 26 is available to correct or augment the MPEG-2 bit stream fields.

The foregoing description of the preferred embodiment of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of embedding auxiliary data into host data compressed by lossy compression ratio methods that use series expansion and quantization techniques comprising the steps of:

creating a duplicate digital compression representation of said host data in terms of intermediate integer indices representing coefficients, said digital compression representation having certain statistical properties;

creating a digital representation of said auxiliary data in the form of a sequence of individual bit values;

evaluating said digital compression representation to determine pairs of integer indices differing by a specified number of units and occurring with similar frequency in said digital compression representation;

replacing individual integer indices in said digital compression representation with values taken from a digital key comprising a schedule of said pairs of integer indices in order to embed individual bit values corresponding to said sequence of individual bit values of said auxiliary data; and outputting said digital compression representation with said auxiliary data embedded into a file format specified for said compressed data.

2. The method as described in claim 1 further comprising the step of combining said auxiliary data with predetermined information indicative of the presence of said auxiliary data, its file name, and file size, said step to be performed after the step of digitizing said auxiliary data.

3. The method as described in claim 1 further comprising the step of equalizing said statistical properties of said digital compression representation for the purpose of improving said lossy compression ratio methods.

4. The method as described in claim 1, wherein said digital compression representation originates from a color image compressed with the JPEG or WSQ algorithm, and their derivative compression representations.

5. The method as described in claim 1, wherein said digital compression representation originates from a black and white image compressed with the JPEG or WSQ algorithm, and their derivative compression representations.

6. The method as described in claim 1, wherein said digital compression representation originates from a television or video disc signal compressed with the MPEG and DCT-based algorithms, and their derivative compression representations.

7. The method as described in claim 1, wherein said digital compression representation originates from digital audio represented by lossy compression representations.

8. The method as described in claim 1, wherein said digital compression representation originates from X-ray, CT-scan, or Magnetic Resonance Imaging data.

9. The method as described in claim 1, wherein said digital compression representation originates from personal security and identification information.

10. The method as described in claim 1, wherein said digital compression representation originates from fingerprint images.

11. The method as described in claim 1, wherein said digital compression representation originates from images made with a camera producing digital images.

12. A method of constructing embedded a quantity of auxiliary data from a machine readable lossy digital compression representation containing integer indices comprising the steps of:

creating a look-up table defining a correlation between decoded integer indices from said lossy digital compression representation and elements of a key-pair table;

matching said decoded integer indices from said lossy digital compression representation with entries in said look-up table, for determining correspondence of said integer indices from said lossy digital compression representation with said elements in said key-pair;

constructing said auxiliary data according to said correspondence in said look-up table between said integer indices from said lossy digital compression representation and an element in said key-pair table; validating the content and correctness of said auxiliary data by examining header data constructed from the correspondence between said integer indices and said key-pair values; and interpreting said auxiliary bits as data unrelated to said lossy compressed data.

13. The method as described in claim 12, wherein said auxiliary data consist of digital text.

14. The method as described in claim 12, wherein said auxiliary data consist of script or code intended for execution on a network client or server machine.

15. The method as described in claim 12, wherein said auxiliary data consist of motion vector data or script used in the reconstruction of a digital motion picture.

16. The method as described in claim 12, wherein said auxiliary data consist of text or digital audio data used for subtitles or language translation of digital motion picture audio.

17. The method as described in claim 12, wherein said auxiliary data consist of information used to correct degraded, or to decode scrambled image data, for the purpose of controlled service delivery.

18. The method as described in claim 12, wherein said auxiliary data consist of additional or supplemental digital imagery.

19. The method as described in claim 12, wherein said auxiliary data consist of personal identification information.

20. The method as described in claim 12, wherein said auxiliary data consist of medical record or diagnostic information.

21. The method as described in claim 12, wherein said auxiliary data consist of a portion of the said original lossy compressed data.

22. The method as described in claim 12, wherein said auxiliary data consist of encrypted information.

23. The method as described in claim 12, wherein said auxiliary data consist of information transmitted in the space of said lossy compressed representation afforded by the existence of a correspondence between said integer indices and said pair key table.

24. Apparatus for embedding auxiliary data into individual frames of host data having integer indices of certain values and frequencies of occurrence compressed by lossy compression ratio methods that use series expansion and quantization techniques comprising:

buffer storage means receiving said individual frames of host data for entropy decoding, modifying and momentarily storing said integer indices of said individual frames of host data, entropy coding said modifications to said integer indices of said individual frames of host data, and outputting said entropy coded modifications to said integer indices of said individual frames of host data;

histogram analysis means receiving said entropy decoded integer indices of said individual frames of host data for processing a statistical relationship between said frequency of occurrence and said value of said integer indices of said individual frame of host data identify embedding pair candidates in said individual frames of host data, and outputting said embedding pair candidates;

key-pair table means receiving said embedding pair candidates for creating a key-pair table for each of said individual frames of host data, and outputting said embedding pair candidates as a randomized table;

compression embedding means receiving said embedding key pair table, said integer indices from said individual frames of host data retained in said buffer storage, and said auxiliary data for embedding said auxiliary data and said key-pair table into said individual frames of host data and outputting an embedded stream of individual frames of host data.

25. The apparatus as described in claim 24 wherein said buffer storage means, said key-pair table means, and said compression embedding means are contained within a chipset.

26. The apparatus as described in claim 24 wherein said buffer storage means, said key-pair table means, and said compression embedding means are implemented in circuit board circuitry.

27. Apparatus for constructing auxiliary data and a key-pair table embedded into individual frames of host data compressed by lossy compression ratio methods that use series expansion and quantization techniques comprising:

look-up table means receiving said key-pair table from said individual frames of host data for extracting said key-pair table and outputting a key-pair index corresponding to each of said integer indices from said individual frames of host data in a buffer storage; and auxiliary data construction means receiving said key pair table for each of said individual frames of host data and said integer indices from said individual frames of host data stored in said buffer storage for using said key pair to construct said auxiliary data from said individual frames of host data and outputting an auxiliary data bit stream.

28. The apparatus as described in claim 27 wherein said look-up table means and said auxiliary data construction means are contained within a chipset.

29. The apparatus as described in claim 27 wherein said look-up table means and said auxiliary data construction means are implemented in circuit board circuitry.

* * * * *